3,529,727
SUCTION FILTER
Hermann Bernhard, Ostringen, Germany, assignor to "Argo" Gesellschaft mit beschrankter Haftung fur Feinmechanik, Menzingen, Baden, Germany, a corporation of Germany
Filed Sept. 9, 1968, Ser. No. 758,370
Claims priority, application Germany, Sept. 9, 1967, 1,611,040
Int. Cl. B01d 35/16
U.S. Cl. 210—234                      7 Claims

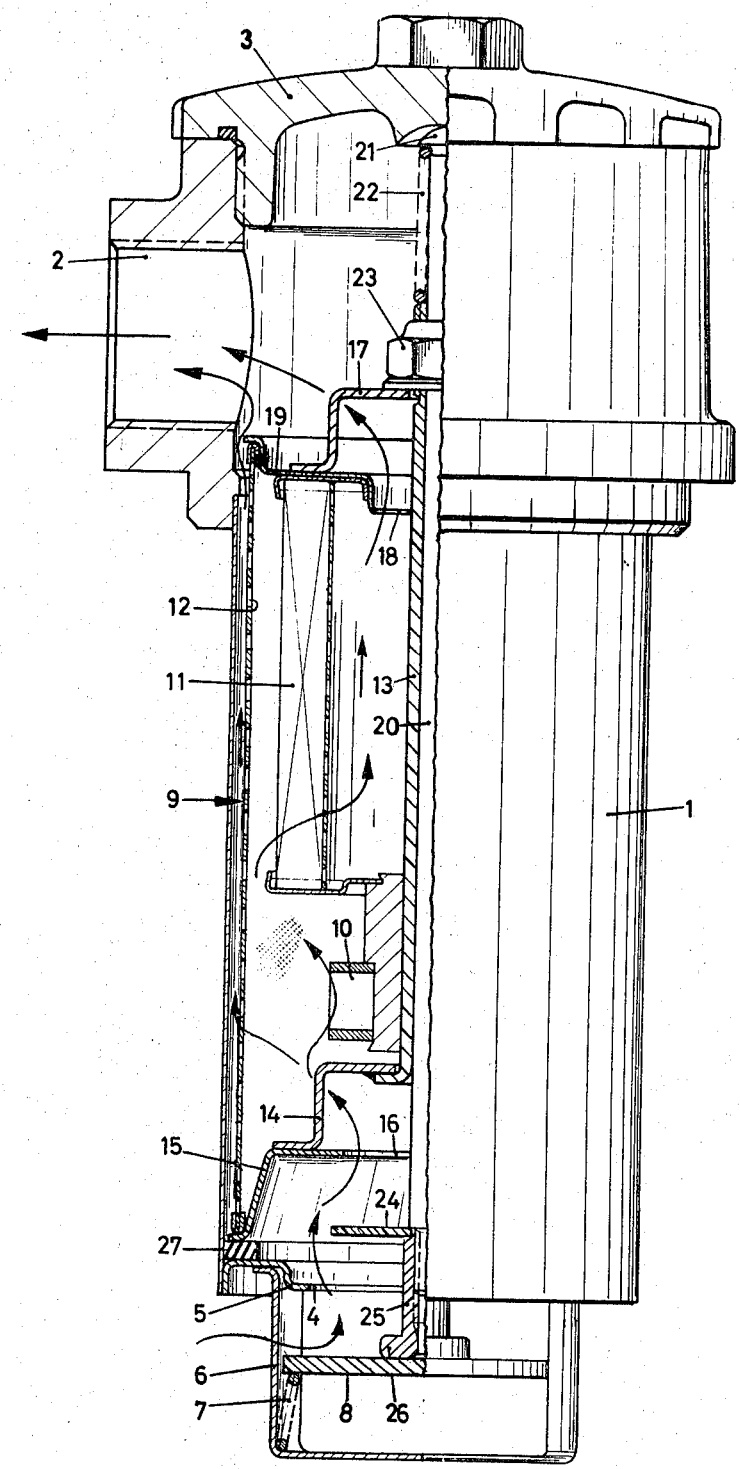

ABSTRACT OF THE DISCLOSURE

An elongated housing for a removable liquid filter cartridge is closed at one end by a removable lid which, in turn, is connected with a valve which automatically closes the intake to the filter when the lid is removed to prevent dirt entering the clean oil side of the filter when the cartridge is removed.

---

The invention concerns a suction filter with a housing closable by a lid, accommodating a filter cartridge and with a valve disposed in an intake opening of the housing, which valve is kept open by the closed lid by means of an actuating rod.

In a known suction filter of the kind indicated, the disadvantage consists in that on removal of the filter cartridge, e.g., for the purpose of replacement or cleaning, dirt from the intake opening of the insert, held by the filter, gets out into the housing and thereby to the clean oil side of the suction filter.

The invention starts out from the task of proposing a suction filter, where dirt, which has been held back during the exchange of the filter cartridge, cannot reach the clean oil side.

According to the invention, the task is solved by arranging a further valve, at the inlet opening of the filter cartridge, which is held open by the closing housing lid, which valve closes automatically upon removal of the lid.

It is of advantage if the lid of the housing is provided with a threaded lid.

It is also an advantage to provide a valve disk attached to a spring-loaded actuating rod guided slidably in the longitudinal axis of the filter cartridge, said valve disk closing the inlet opening of the cartridge whenever the lid is removed from the outside through the action of a spring. Furthermore, the actuating rod is guided in a sleeve and has a stop surface for one end of the spring, which is supported at its other end by said sleeve.

A preferred embodiment of a suction filter according to the invention is characterized in that after screwing off the valve disk from the actuating rod, the filter cartridge is detachable.

The sleeve that guides the actuating rod is attached to the bottom plate carrying the inlet opening of the filter cartridge and a nut screwed onto the sleeve holds the elements of the filter cartridge together.

Finally, the bottom plate of the filter cartridge forms a seat for the valve disk and with its edge is pressed against the filter housing to form a seal.

The following description of a preferred embodiment of the invention together with the enclosed drawing provides further explanation, in which the single figure is a view in elevation with one side of the device shown in cross-section.

The embodiment of a suction filter according to the invention represented in the drawing shows a housing 1. The cylindrical housing, which during operation is preferably mounted with its longitudinal axes horizontal, has at its upper wider section an outlet opening 2 for the oil cleaned by the suction filter. The housing 1 is capable of being closed by a lid, for example a screw lid 3. The end of housing 1 away from the lid is closed by a bottom plate 5 provided with a central opening 4. A holding bracket 6 extending downward is attached to bottom plate 5. This holding bracket serves to control a compression spring 7 which is braced with one end on bracket 6. The other end of the spring presses against a valve disk 8.

A filter cartridge 9 is provided in the interior of the housing 1. This filter cartridge is formed of a magnetic filter 10 and a star shaped filter 11 provided above the magnetic filter 10. The two filters 10 and 11 are finally encased in a third filter element, such as the foraminous cylinder 12.

A sleeve 13 is provided along the longitudinal axis of the filter cartridge 9. Sleeve 13 is at its lower end connected with a bracket 14. Bracket 14 is in turn fastened to a base plate 15 at the outer offset edge of which the cylinder 12 rests. Base plate 15 has a central inlet opening 16 through which the oil from opening 4 arrives in filter cartridge 9. The upper end of the sleeve 13 ends in an upwardly directed bracket support 17. Bracket support 17 is in turn placed on a cover plate 19 holding filter cartridge 9 together and having an opening 18.

Sleeve 13 serves to guide an actuating rod 20. The upper end of rod 20, protruding from sleeve 13, ends in a stop face 21, which lies in a centrally disposed indentation in the lid 3. The compression spring 22 surrounding the free protruding end of the actuating rod 20 engages stop face 21 with one of its ends, while its other end engages against a nut 23 screwed onto sleeve 13 tending to move rod 20 upward.

A valve disk 24 is screwed onto the other end of rod 20, which is threaded and extends through central opening 4 of the bottom plate 5. Valve disk 24 is provided with a threaded sleeve 25 which with its reinforced end 26 rests against the spring loaded valve disk 8.

During operation of the suction filter, which is to be mounted vertically or horizontally, the two valves 8 and 24 are lifted off from the associated valve openings 4 and 16 respectively by the actuating rod 20, which is pressed down by a closed lid 3. The flow of oil to be cleaned arrives via central opening 4 of bottom plate 5 in the space formed by the depression in base plate 15. From there the oil flows through intake opening 16 in filter cartridge 9. The first cleaning of the oil takes place by means of magnetic filter 10. The oil stream then divides in the area of magnetic filter 10. While one oil stream merely flows through the somewhat coarser foraminous cylinder 12 and from there directly to outlet opening 2 of the housing, the other oil stream flows through the finer star-shaped filter 11 and from this to outlet opening 2. (The course of the oil stream in the filter housing is indicated by arrows.)

In the course of time the individual filters of cartridge 9 become clogged with the dirt particles present in the oil, so that a dismantling of filter cartridge 9 for the purpose of cleaning or replacement is necessary. After turning off the oil pump, screw lid 3 is opened. Through the loosening of the lid, actuating rod 20 pushes upward due to spring 22 being in engagement with stop face 21. Thereby valve disk 24 connected with actuating rod 20 moves close to the intake opening 16 of the filter cartridge 9. But at the same time also valve disk 8 is forced by compression spring 7 closer to central opening 4 of bottom plate 5. Shortly before lid 3 is completely unscrewed, valve disk 24 closes off intake opening 16 completely, while on the other hand opening 4 is still somewhat open. Only when lid 3 is removed does spring 7 force the actuating rod 20, which now has been released, so far upward that valve disk 8 closes opening 4.

By the closing of intake opening 16 by valve disk 24 the dirt accumulated in the bottom space of filter cartridge 9 cannot get into filter housing 1, and thereby into the clean oil side of the suction filter when the cartridge is pulled out. The dirt is rather pulled out with the filter cartridge 9 and can subsequently be removed.

After unscrewing valve disk 24 which is connected with threaded sleeve 25 from the actuating rod 20 the latter can be pulled out of the filter cartridge 9. By loosening nut 23 from the upper threaded portion of sleeve 13 the star-shaped filter 11 connected with end plate 19 can be pulled out of the foraminous cylinder 12. The magnetic filter 10 which is movably disposed on sleeve 13 can likewise be taken off for the purpose of cleaning. Furthermore, base plate 15 can now also be separated from cylinder 12.

The mounting of the cleaned, or replacement filter cartridge, held together by the nut 23, takes place in the reverse order. It is thereby to be noted that filter cartridge 9 with its base plate 15 is pressed firmly against the seal 27 at the bottom of housing 1, so that the clean oil side of the housing is sealed against the oil stream that is to be cleaned.

Having disclosed a preferred form of the invention, it will be understood that various modifications and changes may be made which would come within the scope of the annexed claims.

I claim:

1. In a liquid filter, the combination including a housing, a removable filter cartridge contained within said housing, said housing having an opening closed by a removable lid for the insertion and removal of said filter cartridge, said housing being provided with an inlet and an outlet opening, a valve in said inlet opening, said cartridge also having an inlet opening and another valve in said last mentioned inlet opening, biassing means for urging said first valve to close the inlet opening of the housing, and actuating means for holding said first valve open in opposition to said biassing means when the lid is in place and for closing said another valve in the inlet of the cartridge when the lid is removed.

2. The invention defined in claim 1, wherein the lid is threadedly received in the first mentioned opening of the housing.

3. The invention defined in claim 1, wherein said filter cartridge includes an elongated passage, and said actuating means for the valves includes a rod extending slidably through said passage, and a spring connected with said rod for urging said valve in the cartridge inlet toward the closed position.

4. The invention defined in claim 3, wherein said passage in the filter cartridge includes an elongated sleeve surrounding said slidable rod, said spring being connected between one end of the rod and said sleeve, said one end of the rod projecting into engagement with the inner surface of the lid for holding the valves open.

5. The invention defined in claim 4, wherein said filter cartridge includes an end plate having a central opening to provide said inlet, said valves including a disc threadedly attached to the other end of said rod, whereby when said rod is disconnected from said valves, said cartridge may be removed from the housing.

6. The invention defined in claim 4, wherein said filter cartridge comprises a plurality of elements surrounding said sleeve and slidably received thereon, said elements including a pair of end plates, one end of the sleeve being secured to one end plate, the other end of the sleeve having a threaded connection with the other end plate, whereby said elements may be disassembled when said other end plate is removed.

7. The invention defined in claim 6, wherein one of said end plates includes a central opening to provide said inlet for the cartridge, said one end plate having a flanged portion surrounding said opening for sealing engagement with said housing.

References Cited

UNITED STATES PATENTS

| 2,793,752 | 5/1957 | Jay | 210—130 |
| 3,368,679 | 2/1968 | Bozek | 210—234 X |
| 3,368,680 | 2/1968 | Bozek | 210—234 X |
| 3,405,804 | 10/1968 | Rosaen | 210—234 X |

FOREIGN PATENTS

| 604,842 | 7/1948 | Great Britain. |
| 761,611 | 11/1956 | Great Britain. |
| 333,469 | 12/1935 | Italy. |

REUBEN FRIEDMAN, Primary Examiner

F. A. SPEAR, JR., Assistant Examiner

U.S. Cl. X.R.

210—315